United States Patent
Chouinard et al.

(10) Patent No.: US 7,677,518 B2
(45) Date of Patent: Mar. 16, 2010

(54) ADJUSTABLE STAND FOR MONITOR AND KEYBOARD

(76) Inventors: Guy Chouinard, 2015 Simcoe St. N., Oshawa, Ont. (CA) L1H 7K4; Monique Amyotte, 184 Krieghott Ave., Unionville, Ont. (CA) L3R 1W3; Ghislain Chabot, 552 Dundas St. E., Whitby, Ont. (CA) L1N 2J4

( * ) Notice: Subject to any disclaimer, the term of this patent is extended or adjusted under 35 U.S.C. 154(b) by 0 days.

(21) Appl. No.: 12/010,536

(22) Filed: Jan. 25, 2008

(65) Prior Publication Data

US 2008/0203865 A1    Aug. 28, 2008

(51) Int. Cl.
*A47G 29/00* (2006.01)
*A47F 5/12* (2006.01)

(52) U.S. Cl. ............ 248/370; 108/10; 108/144.11; 248/157; 248/178.1; 248/188.2; 187/269; 254/122

(58) Field of Classification Search ............ 248/419, 248/421, 185.1, 370–371, 917–919, 157, 248/188.2, 178.1; 254/121–126, 7 C, 8 R; 108/8–10, 6, 144.11, 145, 147.1; 187/211, 187/210, 237, 267–269; 414/495, 785, 814
See application file for complete search history.

(56) References Cited

U.S. PATENT DOCUMENTS

| | | | |
|---|---|---|---|
| 4,691,886 A | 9/1987 | Wendling et al. | |
| 4,729,533 A | 3/1988 | Hillary et al. | |
| 5,037,054 A | 8/1991 | McConnell | |
| 5,044,284 A | 9/1991 | Gross | |
| 5,174,223 A * | 12/1992 | Nagy et al. | 108/50.01 |
| 5,200,859 A | 4/1993 | Payner et al. | |
| 5,287,815 A | 2/1994 | Gross | |
| 5,405,204 A | 4/1995 | Ambrose | |
| 5,445,353 A * | 8/1995 | Sakamoto | 248/421 |
| 5,564,668 A | 10/1996 | Crowe, II | |
| 5,636,711 A * | 6/1997 | Nussbaum | 187/211 |
| D393,382 S * | 4/1998 | Rutter et al. | D6/474 |
| 5,829,948 A * | 11/1998 | Becklund | 254/8 R |
| 5,938,622 A * | 8/1999 | Chen | 600/576 |
| 5,961,231 A * | 10/1999 | Ambrose | 400/472 |
| 6,286,812 B1 * | 9/2001 | Cherry | 254/122 |
| 6,585,214 B1 * | 7/2003 | Dittmer | 248/370 |
| 6,736,469 B2 | 5/2004 | Long | |
| 6,905,102 B2 | 6/2005 | Lin et al. | |
| 7,111,825 B2 * | 9/2006 | Landsberger et al. | 254/126 |
| 7,383,786 B2 * | 6/2008 | Giannasca | 108/144.11 |

* cited by examiner

*Primary Examiner*—Amy J Sterling
*Assistant Examiner*—Tan Le

(57) ABSTRACT

The adjustable stand has lower and upper components spaced vertically apart. The upper component supports a monitor of a computer and is movable upwardly and downwardly relative to the lower component while the lower component remains fixed in position. An operator of the computer can accordingly adjust the monitor to eye-level whether the operator is standing or is seated. A platform supports a keyboard and is movable with the upper component. The level of the platform may be adjusted selectively upwardly and downwardly relative to the upper component.

10 Claims, 6 Drawing Sheets

ADJUSTABLE STAND FOR MONITOR AND KEYBOARD

This application claims priority pursuant to 35 U.S.C. 119 based on Canadian application No. 2,575,492, filed Jan. 25, 2007, which application is incorporated herein in its entirety.

FIELD OF THE INVENTION

This invention relates to stands for computers and more particularly to an adjustable stand which closes for compact storage and which opens to support a monitor and keyboard of a computer. The stand supports the monitor and keyboard at various levels for use by an operator who is seated, standing or crouching.

BACKGROUND OF THE INVENTION

Many people spend substantially the whole of their working days in front of computers. Not only does such work cause eye strain but it also frequently causes muscle pain. As is now well known, a person can suffer such pain not only when he is engaged in heavy or repetitious work but also when he is inactive. He will be largely inactive if he is seated in front of a computer all day and such inactivity can have a deleterious impact on his health.

Stands for computers conventionally support the keyboard and monitor at a level intended for use by an operator who is sitting on a chair. The operator has only a limited range of movement while he is seated and operating the computer and cannot, for example, take an upright position in order to exercise his legs and back nor can he crouch on the floor while he is operating the device.

We have invented an adjustable stand in which the level of a monitor and a keyboard of a computer can be adjusted so that an operator can operate the device while he is seated, standing or crouching on the floor. Adjustment of the level can be carried out rapidly and easily by means of a switch beside the keyboard so that he can continuously change the level as he is working. By changing his posture frequently while he works, he can avoid much of the pain which he would otherwise suffer if he remained seated over a lengthy period of time.

SUMMARY OF THE INVENTION

Briefly, the adjustable stand of our invention includes: a stand having lower and upper components, the upper component adapted to support the monitor; means for causing the upper component to move selectively upwardly and downwardly relative to the lower component; a platform adapted to support the keyboard and movable with the upper component; and means for causing the platform to move selectively upwardly and downwardly relative to the upper component.

DESCRIPTION OF THE DRAWINGS

The adjustable stand of the invention for a monitor and keyboard of a computer is described with reference to the accompanying drawings in which.

Like reference characters refer to like parts throughout the description of the drawings.

DESCRIPTION OF PREFERRED EMBODIMENTS

Figure 1:
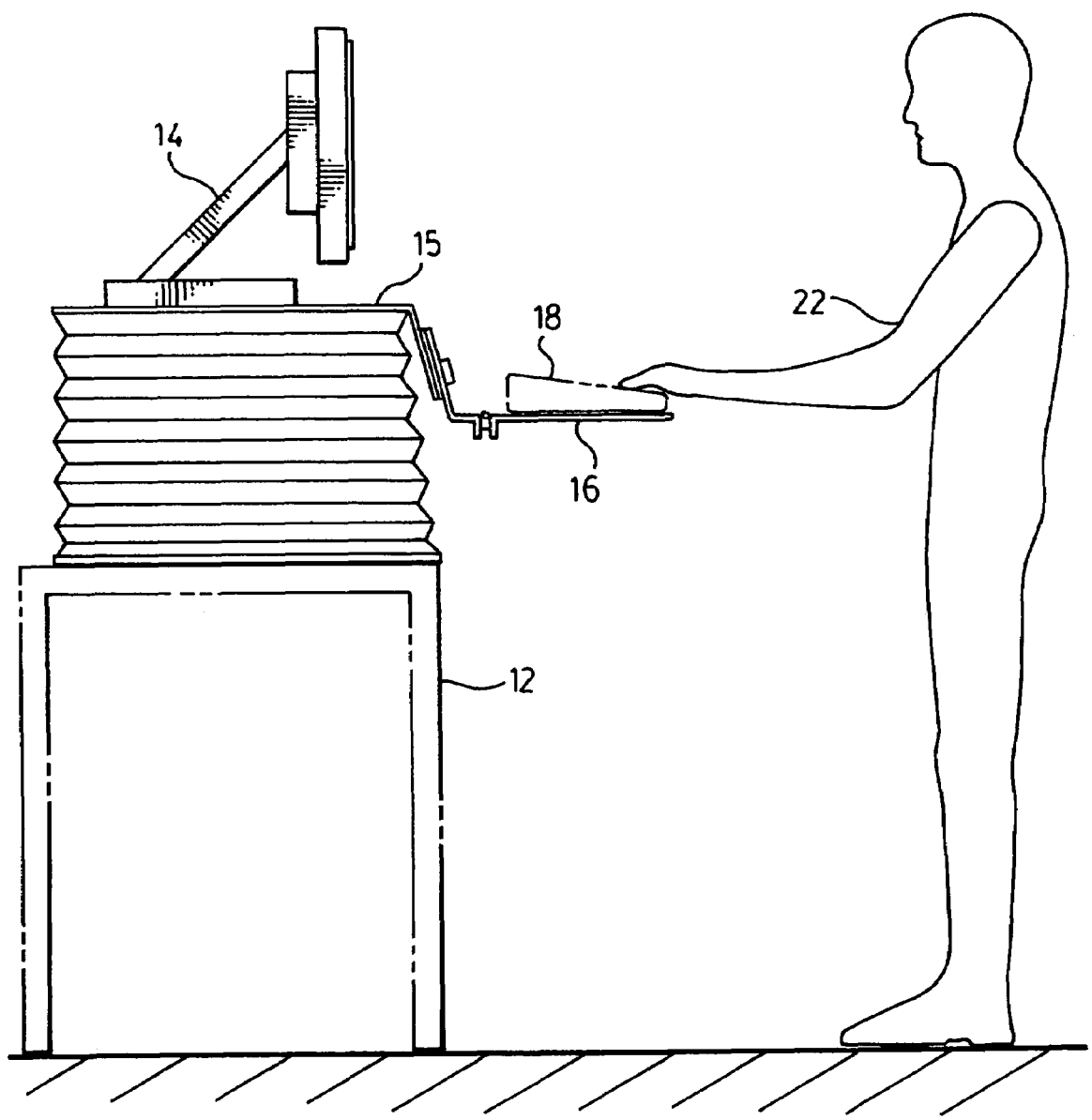
FIG. 1 is an elevation of the adjustable stand on which a monitor and a keyboard are seated in conjunction with a standing operator.
Figure 2:
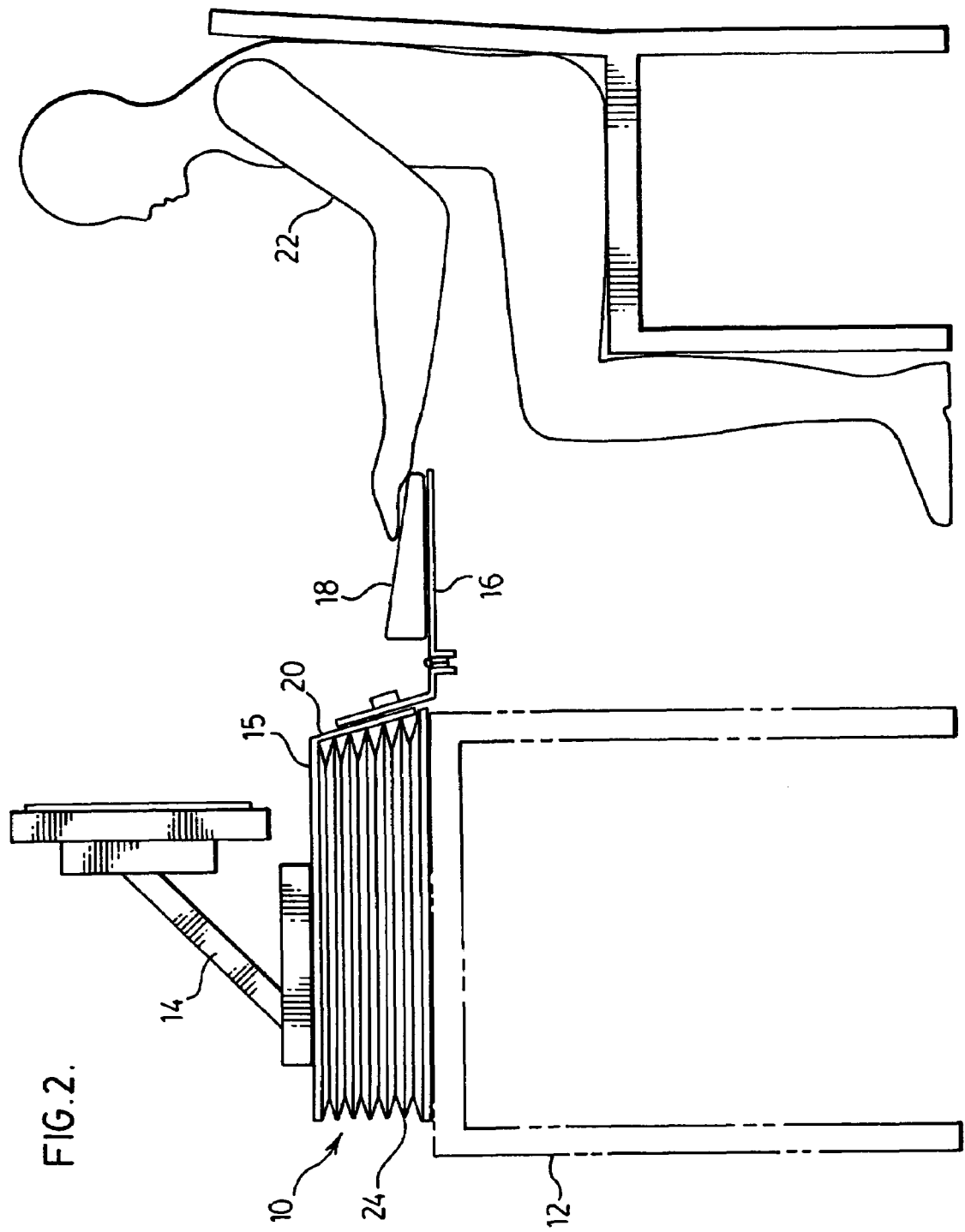
FIG. 2 is an elevation of the adjustable stand, monitor and keyboard in conjunction with a seated operator.

With reference to FIGS. 1 and 2, the adjustable stand of the invention, generally 10, is mounted on a table 12. A conventional monitor 14 of a computer rests on the top wall 15 of the adjustable stand and a platform 16 for keyboard 18 is attached to the front wall 20 of the adjustable stand. The table is intended to be placed on a floor or other flat surface adjacent to an operator 22 of the computer.

Figure 4:
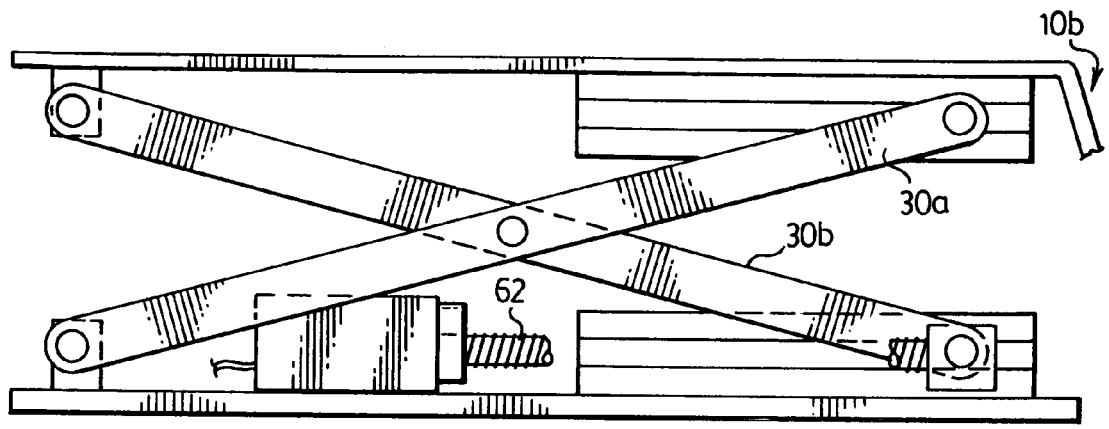
FIG. 4 is an elevation of the adjustable stand in a closed position.
Figure 5:
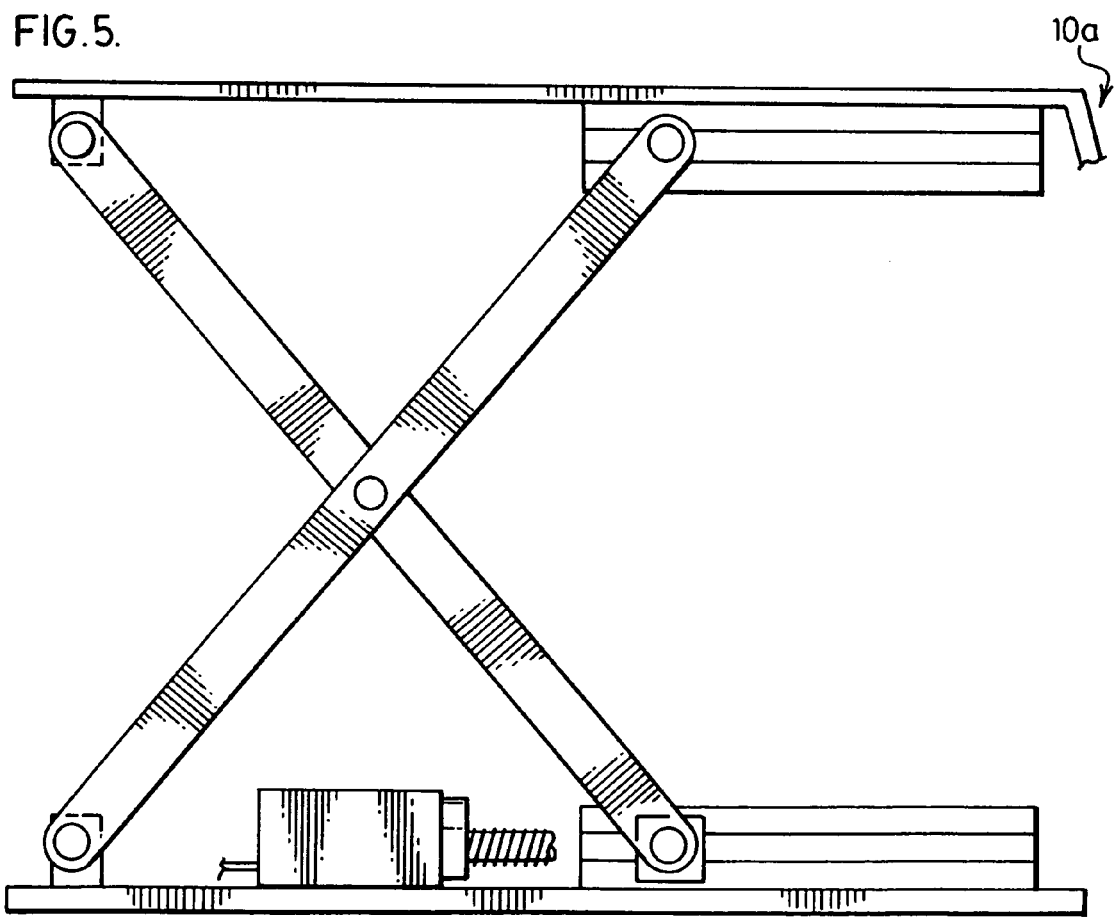
FIG. 5 is an elevation of the adjustable stand in an open position.

With reference to FIGS. 4 and 5, the adjustable stand is composed of two components, a lower component, generally 10a and an upper component, generally 10b. The two components can be opened and closed by adjusting the elevation of the upper component relative to the lower component. The means for doing so is described below.

In FIGS. 1 and 4, the upper component is in a lower or closed position in which it and lower component are relatively close together. In FIGS. 2 and 5, the upper component is in an upper or open position in which it and the lower component are open or relatively far apart. When the upper component is in the lower or closed position, it supports the monitor and keyboard at a level which is suitable for the operator when he or she is seated. When the upper component is in the upper or open position, it supports the monitor and keyboard at a level which is suitable for the operator while standing. The level of the upper component can be fixed at any level between the lower and upper positions illustrated in the drawings.

The two components of the stand as well as the mechanism for adjusting their relative positions is concealed by bellows 24 which define the outer side walls of the adjustable stand.

Figure 3:
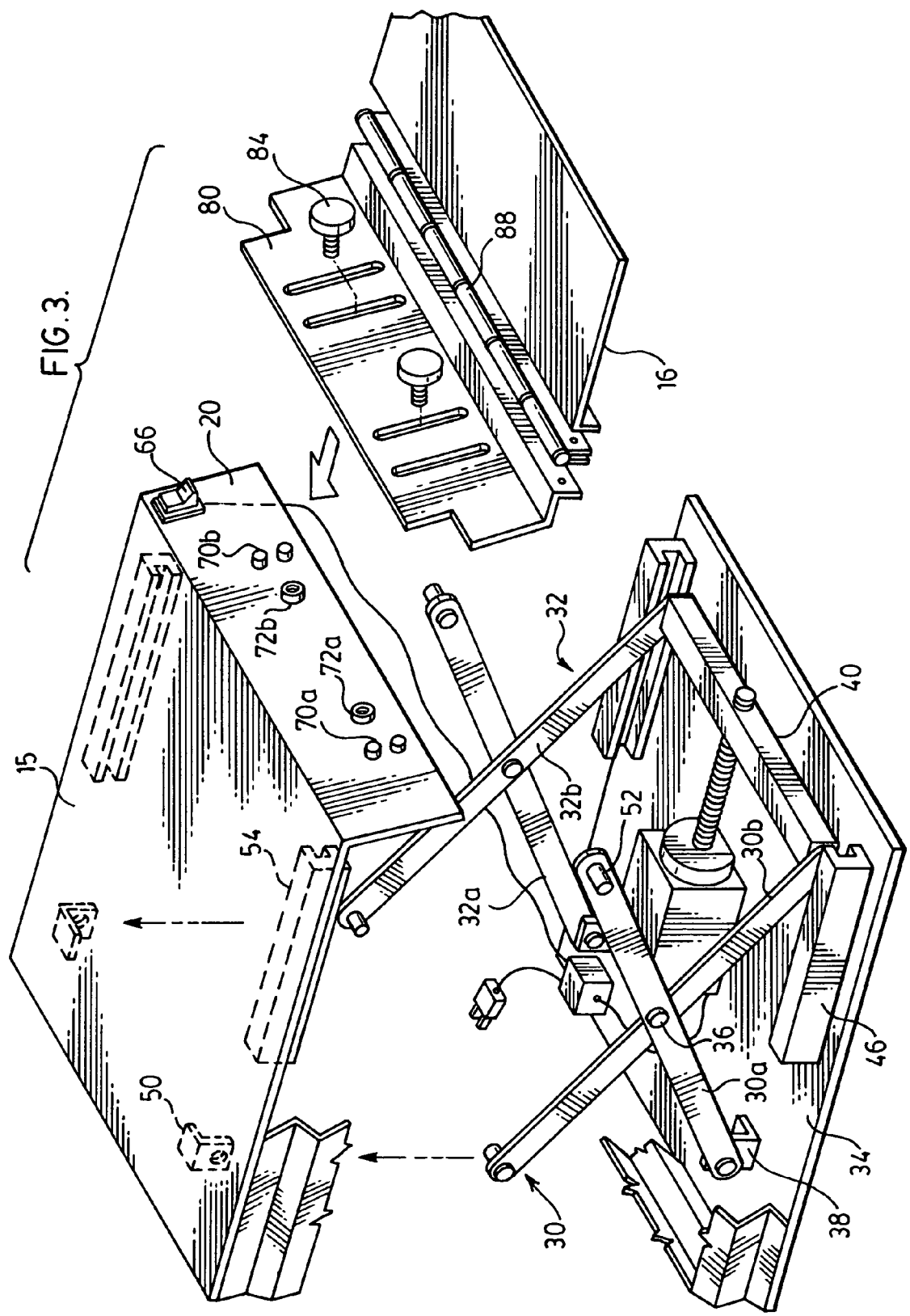
FIG. 3 is a partly exploded perspective view of the adjustable stand.
Figure 6:
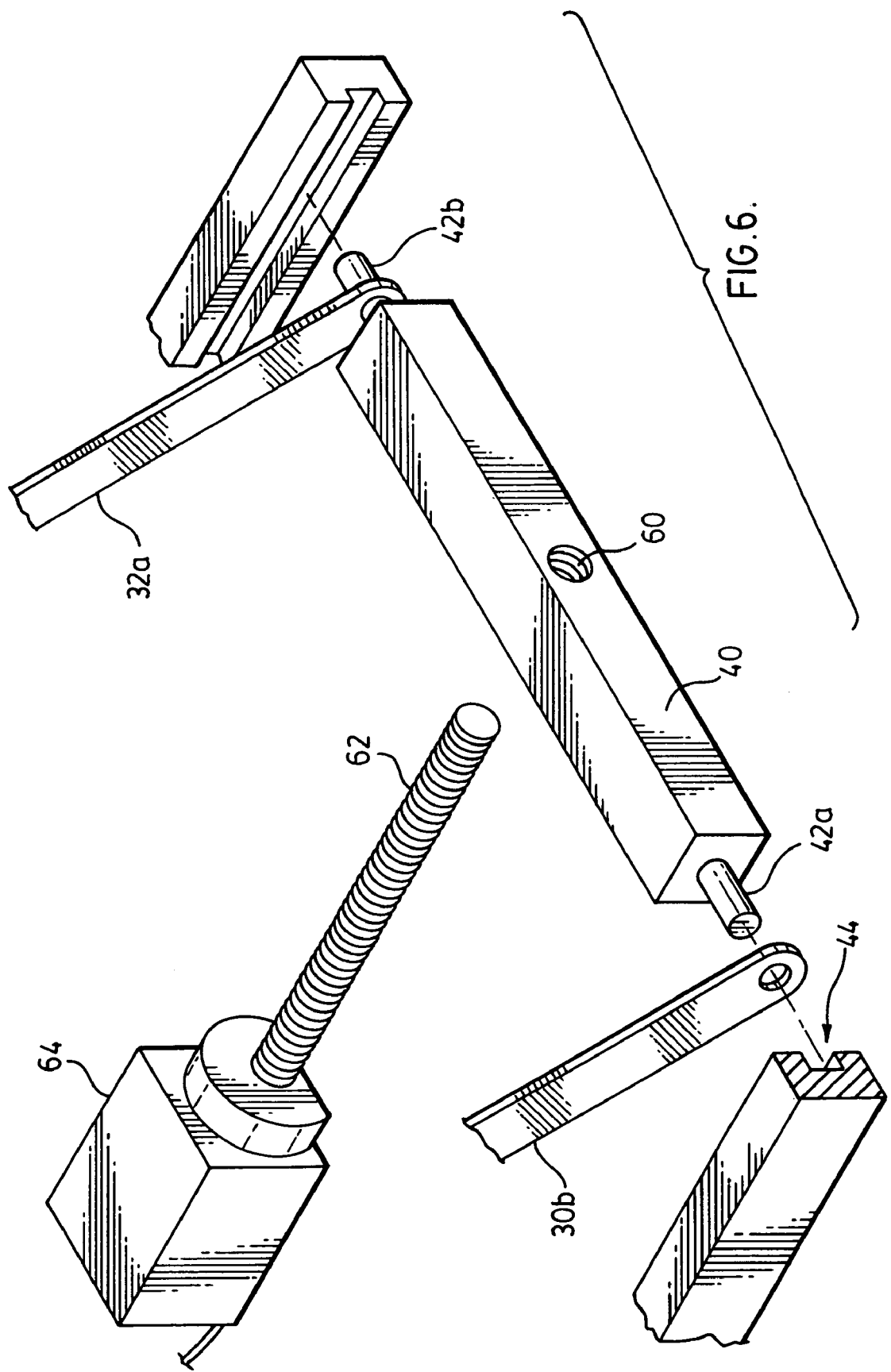
FIG. 6 an exploded perspective view of the mechanism for opening and closing the adjustable stand.

With reference to FIGS. 3 and 6, two pairs of spaced apart arms, generally 30, 32 extend upwardly from the lower wall 34 of the adjustable stand. Each pair of arms is pivotally interconnected at a point intermediate their ends by means of a pin 36.

With respect to arms 30, the lower end of arm 30a is pivotally connected to an ear 38. With respect to the lower end of arm 30b, it is interconnected to the lower end of arm 32b by means of a horizontally extending bar 40 which extends between the two ends. Pins 42a, b extend outwardly from opposite ends of the bar and the pins pass through openings in the lower ends of the two arms 30b, 32b and into a track 44 formed in a horizontally extending channel 46 along which the pin is free to slide. Both the ear and channel are bolted to the upper surface of the lower wall 34 of the lower component.

The upper end of arm 30b is pivotally connected to an ear 50 while the upper end of arm 30a has an outwardly extending pin 52 which runs in a horizontally extending track formed in channel 54. Both ear 50 and channel 54 are bolted to the lower surface of the upper wall 15 of the upper component of the adjustable stand.

The other pair of arms 32 are attached to the lower and upper walls of the adjustable stand in the same manner. The tracks in the two channels attached to the lower wall are parallel to each other as are the tracks in the two channels attached to the upper wall. All four tracks are parallel to one another.

As previously mentioned, bar 40 extends between and interconnects the lower ends of arms 30b and 32b. A threaded opening 60 is formed centrally of the ends of the bar for receipt of a threaded spindle 62. The spindle is rotated by an electric motor or prime mover 64 which is bolted to the lower wall of the stand. The spindle and motor are positioned such that the longitudinal axis of the spindle is oriented parallel to the tracks in all four channels. The motor operates both forward and in reverse to cause the spindle to rotate selectively clockwise or counterclockwise. The operation of the motor is controlled by means of a switch 66 mounted to the front wall 20 of the upper component.

With reference to FIGS. 3, 4 and 5, depending upon which way the spindle is rotating, it will cause bar 40 either to advance toward the front wall 20 or to move away from it. Movement of the bar away from the front wall causes arms 30b, 32b to swing toward a vertical position i.e. from the position illustrated in FIG. 4 to the position illustrated in FIG. 5. As the arms swing in this direction, they cause the other two arms in 30a, 32a to likewise swing to a vertical position. Movement of the arms in this manner results in the upper component moving vertically upward and away from the lower component.

Rotation of the spindle in the opposite direction causes the upper component to descend toward the lower component.

It should be noted that the construction of the arms and the way in which they move causes the upper component to move vertically toward and away from, the lower component as the spindle rotates but not horizontally with respect to each other. Accordingly not matter at what elevation the upper component is, the keyboard on platform 16 will always remain at the same distance from the operator. If the operator is seated as in FIG. 2 for example, he or she will not have to move his chair toward or away from the keyboard if he or she adjusts the level of the keyboard.

Figure 8:
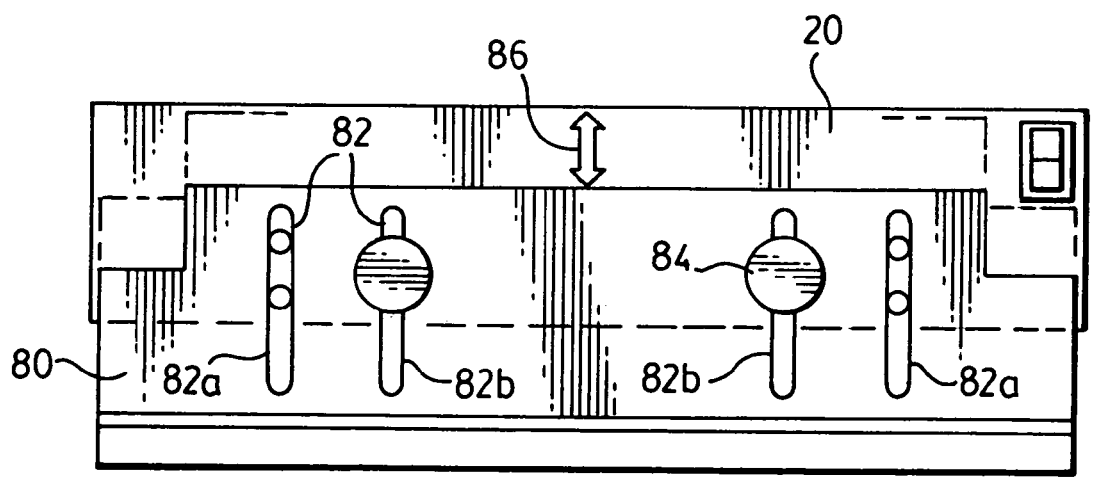
FIG. 8 is an elevation of a front wall of the adjustable stand on which the platform is attached.

With reference to FIGS. 3 and 8, the upper edge of the front wall 20 is attached to the upper wall 15 of the upper component. The front wall slopes downwardly and outwardly of the adjustable stand and is provided with two pairs of vertically extending locating pins 70a,b. Adjacent to each pair is a threaded opening 72a,b.

The platform 16 on which the keyboard is seated has a rear wall 80 having four parallel upwardly extending slots 82. The slots are located in such a way that the rear wall 80 may be placed adjacent to the front wall 20 so that the locating pins 70 fit into the outer slots 82a while the threaded openings 72 in the front wall open into the inner slots 82b. The rear wall can be attached to the front wall by means of thumb screws 84 and the elevation of the rear wall relative to the front wall can be adjusted by loosening the thumb screws so that the rear wall can be raised or lowered in the direction of arrow 86 relative to the front wall.

Figure 7:
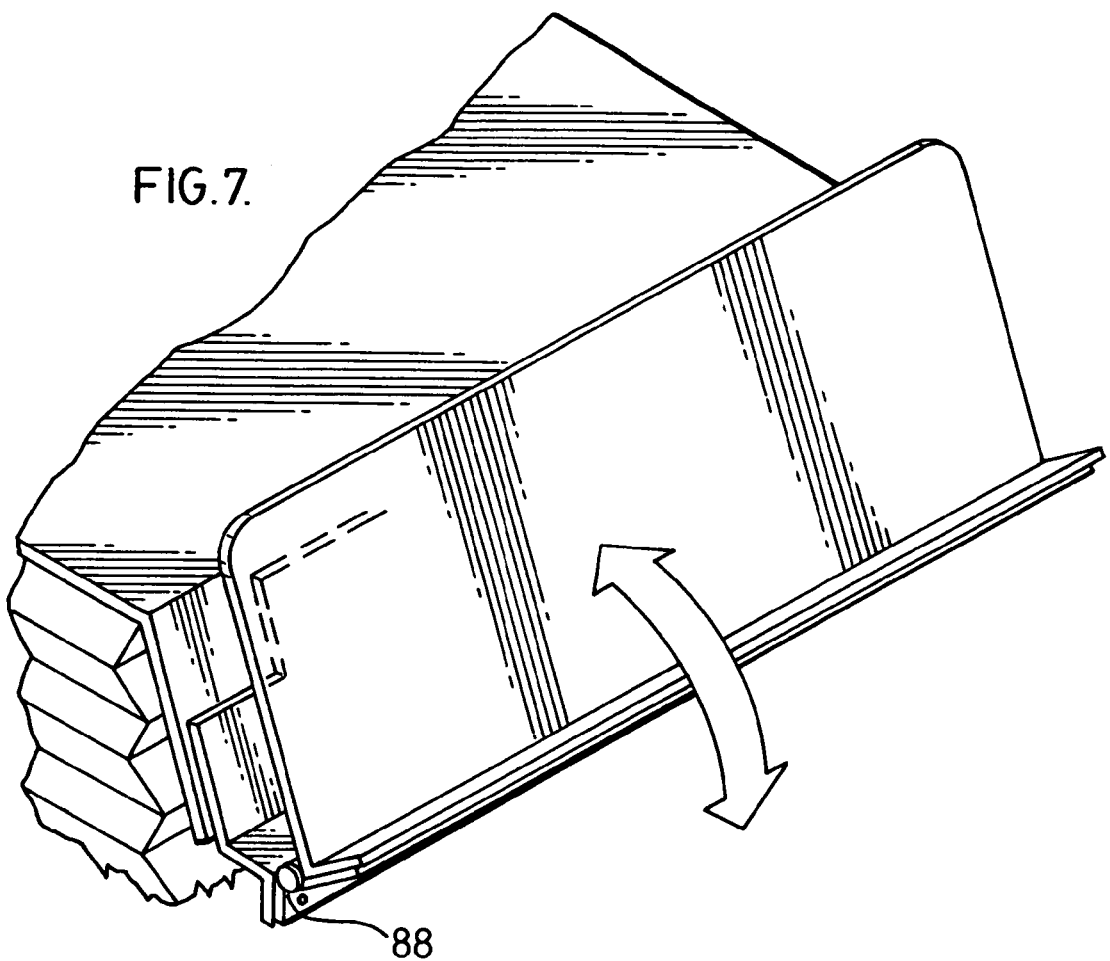
FIG. 7 is a perspective view of the platform on which a keyboard is adapted to be seated.

With reference to FIGS. 3 and 7, platform 16 has a horizontal wall 88 which extends forward from the lower edge of the rear wall 80. The horizontal wall is attached to the rear wall by means of a hinge 88 which allows the horizontal wall to swing from a horizontal position illustrated in FIG. 3 to a generally vertical position illustrated in FIG. 7. The latter position is suitable where the adjustable stand is being stored.

It will be understood, of course, that structural modifications can be made in the adjustable stand of the invention without departing from the scope and preview of the invention as defined in the appended claims.

We claim:

1. An adjustable stand for a monitor and a keyboard of a computer, said stand having lower and upper components, an upper component adapted to support said monitor; means for causing said upper component to move selectively upwardly and downwardly relative to said lower component; a platform positioned at a level beneath said upper component and adapted to support said keyboard horizontally at a level beneath the level at which said upper component supports said monitor, said platform being movable with said upper component; and means for causing said platform, while remaining horizontal, to move selectively vertically upwardly and downwardly relative to said upper component, wherein said means for causing said upper component to move includes first and second pivotally interconnected arms, said first arm being pivotal relative to said lower component and slidable relative to said upper component while said second arm is slidable relative to said lower component and pivotal relative to said upper component, and means for selectively causing one of said arms to slide relative to whichever of said components said arm is slidable.

2. The adjustable stand of claim 1 wherein said arms slide in tracks, said tracks being oriented horizontally.

3. The adjustable stand of claim 1 wherein said means for causing said arms to slide includes a spindle operatively connected to said arm; and a prime mover for causing said spindle to rotate selectively clockwise and counterclockwise with resulting sliding of said one arm.

4. An adjustable stand for a monitor and a keyboard of a computer, said stand having lower and upper components, an upper component adapted to support said monitor; means for causing said upper component to move selectively upwardly and downwardly relative to said lower component; a platform positioned at a level beneath said upper component and adapted to support said keyboard horizontally at a level beneath the level at which said upper component supports said monitor, said platform being movable with said upper component; and means for causing said platform, while remaining horizontal, to move selectively vertically upwardly and downwardly relative to said upper component, wherein said means for causing said upper movement to move includes two pairs of spaced apart first and second pivotally interconnected arms, said first arm in each said pair being pivotal relative to said lower component and slidable relative to said upper component while said second arm in each said pair is slidable relative to said lower component and pivotable relative to said upper component, and means for selectively causing one of said arms in each said pair to slide relative to whichever of said components said one arm is slideable.

5. The adjustable stand as claimed in claim 4 wherein said arms slide in tracks, said tracks being oriented horizontally.

6. The adjustable stand of claim 4 wherein said means for causing said arms to slide includes a spindle operatively connected to said one arm in each said pair; and a prime mover for causing said spindle to rotate selectively clockwise and counterclockwise with resulting sliding of said one arm in each said pair.

7. An adjustable stand for a monitor and a keyboard of a computer, said stand having lower and upper components, an upper component adapted to support said monitor; means for causing said upper component to move selectively upwardly and downwardly relative to said lower component; a platform positioned at a level beneath said upper component and adapted to support said keyboard horizontally at a level beneath the level at which said upper component supports said monitor, said platform being movable with said upper component; and means for causing said platform, while remaining horizontal, to move selectively vertically upwardly and downwardly relative to said upper component, wherein said upper component includes a downwardly extending front wall and said platform includes a horizontal wall and an upwardly extending rear wall, said rear wall being mounted for sliding upwardly and downwardly on said front wall, said front and rear walls being oriented such that as said rear wall slides upwardly and downwardly as aforesaid, said horizontal wall remains horizontal, said platform including means for selectively immobilizing said rear wall relative to said front wall.

8. The adjustable stand as claimed in claim 7 wherein said horizontal wall is pivotal relative to said rear wall from a position in which said keyboard is adapted to be seated thereon to a relatively vertical position for storage.

9. The adjustable stand as claimed in claim 7 wherein said rear wall has a plurality of upward extending slots and said front wall has a plurality of locating pins receivable in said slots for guiding the upward and downward movement of said rear wall relative to said front wall.

10. The adjustable stand as claimed in claim 9 wherein said means for selectively immobilizing said rear wall relative to said front wall includes a thumb screw which is adapted to pass through one of said slots and into a threaded opening formed in said front wall, tightening of said thumb screw causing said rear wall to move into engagement with said front wall with resulting immobilization of said rear wall relative to said front wall.

* * * * *